H. W. CAVE-BROWNE-CAVE.
COVER FOR PNEUMATIC AND LIKE TIRES.
APPLICATION FILED OCT. 4, 1906.
929,193.
Patented July 27, 1909.
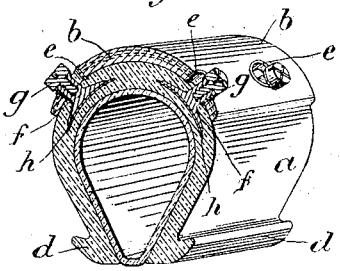
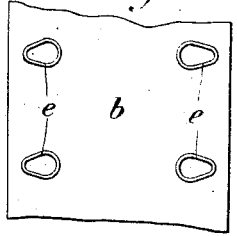
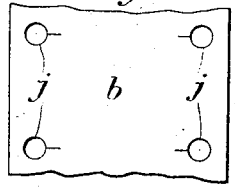
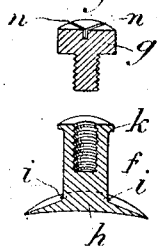
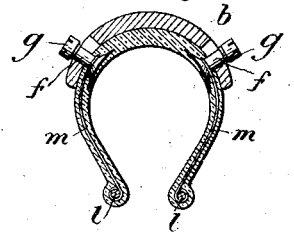
Witnesses.—
P. Woodward
J. Anderson
—Inventor.—
Henry Wilmot Cave-Browne-Cave

UNITED STATES PATENT OFFICE.

HENRY WILMOT CAVE-BROWNE-CAVE, OF LONDON, ENGLAND.

COVER FOR PNEUMATIC AND LIKE TIRES.

No. 929,193.          Specification of Letters Patent.          Patented July 27, 1909.

Application filed October 4, 1906. Serial No. 337,414.

*To all whom it may concern:*

Be it known that I, HENRY WILMOT CAVE-BROWNE-CAVE, a subject of the King of Great Britain, residing at London, England, have invented certain new and useful Improvements in or Pertaining to Covers for Pneumatic and Like Tires, of which the following is a specification.

This invention has reference to improvements in or pertaining to covers for pneumatic and like tires; and relates more particularly to removable tread bands of the kind which are secured by screws, the heads of which project and serve the purpose of preventing or resisting skidding or side slip.

In order that this invention may be readily understood reference is made to the accompanying drawings in which:—

Figure 1 is a sectional perspective view of portion of a fully inflated tire having the present improvements applied thereto. Fig. 2 is a plan of the tread seen in Fig. 1, the tread being opened out flat, showing the apertures through which the necks of the studs pass. Fig. 3 is a similar view to Fig. 1 showing a tread with another form of aperture. Fig. 4 is a sectional perspective view showing separately the connecting stud and its removable screw, and Fig. 5 is a cross section of a cover of modified construction having wired-on edges.

In accordance with this invention the tire cover $a$ Fig. 1 is provided with a removable tread portion $b$ consisting of a peripheral band of leather, or of a suitable fabric such as rubber faced canvas with woven wire backing or reinforcement. The cover $a$ is of the kind that is adapted to be distended by means of an inflatable tube $c$ and has locking projections $d$ for engaging the turned over edges of the rim. The band $b$ is provided along its edges with pear-shaped eyelets or apertures $e$, whose narrow portions are toward the adjacent edges of the band, as is more clearly seen in Fig. 2. In the body of the cover $a$ there are fixed studs $f$ each provided with a removable screw $g$ and with a base $h$ entirely embedded in the substance of the cover, which thus serves to prevent injury to the air tube through oblique stress directly exerted thereon by the bases of the studs. The studs $f$ are fixed in the cover during the formation thereof. The stud bases, each of which is made concave to fit accurately to the curve of the tire, may all be secured to a band woven to a circular shape so as to fit closely against the side of the tire; this may be effected by sewing the studs $f$ to the said band through holes $i$ in the bases $h$. The tread $b$ is most conveniently attached when the tire is deflated by passing the large ends of the slots $c$ over the collars $k$ of the studs $f$. Upon the subsequent inflation of the tire, the tread is distended, the narrow ends of the slots $e$ then engaging around the stems of the studs $f$, and the tread being thus securely fixed.

According to Fig. 3 of the drawings, the tread $b$ is formed with series of buttonholes $j$, consisting of a circular aperture and a slit entering same. Any other convenient form of hole or slot may be employed for the attachment of the tread. The screws $g$ are, as shown, provided with heads of cylindrical form, that are conveniently located to prevent or resist side slip, while remaining out of contact with the road, except when side slip occurs.

In Fig. 5, the tread is shown as applied to a wired-on tire of an existing type.

It is advantageous in some constructions to connect each stud $f$ to the wires $l$ in the edges of the jacket or cover by means of a wire $m$ or it might be a metal strip or stranded wire to give flexibility, so that in the event of side slip the entire strain upon the stud, or a great portion thereof, is taken by the wires $l$.

It is obvious that in all of the foregoing constructions the wear and tear will fall mainly upon the easily removable tread and that the rest of the cover, which includes the wiring or other means of attachment to the rim will require renewal only at long intervals of time. Also by employing the studs having removable screws the latter can easily be renewed without disturbing the studs in the tire cover.

The studs might in some cases be of other than circular shape, for instance they might be elliptical and the shape might assist in securing the studs. The wearing faces of the screw head may be suitably roughened and they may for instance have deep cross cuts $n$, Fig. 4, for the dual purpose of roughening the surface and for enabling a tool to be applied for screwing or unscrewing them. The screw heads may be of any suitable material such as metal, fiber or the like.

What I claim is:—

1. The combination, with a wheel tire having studs projecting therefrom on each side of its crown, and screw heads projecting from the studs and adapted to form a check to side-slipping of the wheel, of a resilient tire tread, the crown of which is out of the plane of the screw heads and having apertures through which the studs extend.

2. In a pneumatic tire, the combination, with a tire cover having edge-wires, and a tire tread or band having side apertures, of studs having their bases embedded in the tire cover and projecting through said apertures, means within said cover connecting the studs with said wires, and suitable heads screwing into and projecting from the studs upon the outside of the band.

In testimony whereof I have hereunto set my hand in presence of two subscribing witnesses.

HENRY WILMOT CAVE-BROWNE-CAVE.

Witnesses:
H. D. JAMESON,
F. L. RAND.